(12) United States Patent
Morgan (10) Patent No.: US 10,563,748 B2
(45) Date of Patent: Feb. 18, 2020

(54) SLEW DRIVE GEARBOX WITH TORQUE TUBE

(71) Applicant: KINEMATICS, LLC, Phoenix, AZ (US)

(72) Inventor: Brent Morgan, Phoenix, AZ (US)

(73) Assignee: KINEMATICS, LLC, Phoenix, AZ (US)

( * ) Notice: Subject to any disclaimer, the term of this patent is extended or adjusted under 35 U.S.C. 154(b) by 0 days.

(21) Appl. No.: 14/489,462

(22) Filed: Sep. 17, 2014

(65) Prior Publication Data

US 2015/0082923 A1    Mar. 26, 2015

Related U.S. Application Data

(60) Provisional application No. 61/879,250, filed on Sep. 18, 2013.

(51) Int. Cl.
| | |
|---|---|
| *F16H 57/039* | (2012.01) |
| *F16H 1/16* | (2006.01) |
| *F16H 19/08* | (2006.01) |

(52) U.S. Cl.
CPC .......... *F16H 57/039* (2013.01); *F16H 1/16* (2013.01); *F16H 19/08* (2013.01); *Y10T 74/18792* (2015.01)

(58) Field of Classification Search
CPC . B65G 33/34; F16H 57/039; F16H 2025/209; F16H 2025/2043
USPC .................. 74/433, 439, 425, 89.14, 724
See application file for complete search history.

(56) References Cited

U.S. PATENT DOCUMENTS

| | | | | |
|---|---|---|---|---|
| 1,903,318 | A | * | 4/1933 | Wildhaber .............. F16H 55/22 74/458 |
| 2,720,119 | A | | 10/1955 | Sherman |
| 2,981,989 | A | * | 5/1961 | Hatch ..................... B22C 9/28 164/137 |
| 3,722,311 | A | * | 3/1973 | Northrup .................. F16H 1/16 74/425 |

(Continued)

FOREIGN PATENT DOCUMENTS

| CN | 101670216 A | 3/2010 |
|---|---|---|
| CN | 101725631 A | 6/2010 |

(Continued)

OTHER PUBLICATIONS

Co-pending U.S. Appl. No. 16/100,141, filed Aug. 9, 2018.

(Continued)

*Primary Examiner* — Bobby Rushing, Jr.
(74) *Attorney, Agent, or Firm* — Wilson Sonsini Goodrich & Rosati (57) ABSTRACT

A slew drive includes a housing, a worm shaft having a worm thread carried within the housing for rotational movement, and a torque tube having an outer diameter and a central socket. The torque tube is carried by the housing for rotational movement perpendicularly to the worm shaft and worm thread. A ring gear section having teeth, is carried by the torque tube so that the teeth extend beyond the outer diameter of the torque tube and engage the worm threads. Rotation of the worm shaft rotates the worm threads engaging the teeth of the ring gear section, thereby rotating the ring gear section which rotates the torque tube relative the housing.

18 Claims, 8 Drawing Sheets

(56) References Cited

U.S. PATENT DOCUMENTS

| | | | | |
|---|---|---|---|---|
| 4,047,449 | A | * | 9/1977 | Popov .................... B23F 13/06 74/425 |
| 4,901,977 | A | * | 2/1990 | Hendrick ................ F16K 3/085 251/208 |
| 5,018,403 | A | * | 5/1991 | Umezono ............... B23F 13/08 409/38 |
| 5,248,009 | A | | 9/1993 | Takehara et al. |
| 5,271,121 | A | * | 12/1993 | Dolegowski ............ B60S 1/08 15/250.12 |
| 6,058,794 | A | * | 5/2000 | Hempel ................ B22D 19/00 164/98 |
| 6,125,713 | A | | 10/2000 | Langlois et al. |
| 6,137,853 | A | | 10/2000 | Duckering et al. |
| 6,237,863 | B1 | * | 5/2001 | Smith .................. A01G 25/092 239/722 |
| 7,475,612 | B2 | * | 1/2009 | Kaneiwa .............. B62D 5/0409 180/444 |
| 8,418,969 | B2 | * | 4/2013 | Schena ..................... B60L 3/04 246/125 |
| 8,453,328 | B2 | * | 6/2013 | Kats ........................ H02S 20/32 29/890.033 |
| 8,904,999 | B2 | | 12/2014 | Kondo et al. |
| 9,074,797 | B2 | * | 7/2015 | Miller .................. G01S 3/7861 |
| 9,464,697 | B2 | * | 10/2016 | Antchak ................ F02B 67/06 |
| 9,816,600 | B2 | | 11/2017 | Morgan et al. |
| 1,004,785 | A1 | | 8/2018 | Morgan |
| 2003/0034196 | A1 | * | 2/2003 | Shimizu ............... B62D 5/0409 180/444 |
| 2004/0025403 | A1 | | 2/2004 | Barker |
| 2008/0026857 | A1 | * | 1/2008 | Grazia ............... B29C 45/14065 464/178 |
| 2010/0050843 | A1 | * | 3/2010 | Gass .................... B23D 45/067 83/477.1 |
| 2011/0056460 | A1 | * | 3/2011 | Kondo ................ F02D 9/1065 123/337 |
| 2011/0278867 | A1 | * | 11/2011 | Watanabe ............... E05B 81/06 292/341.16 |
| 2012/0180780 | A1 | * | 7/2012 | Tseng .................... F24S 30/458 126/606 |
| 2012/0183368 | A1 | | 7/2012 | Fuhrer |
| 2012/0241404 | A1 | | 9/2012 | Bobeck |
| 2012/0242095 | A1 | * | 9/2012 | Niwa ...................... E05B 81/18 292/142 |
| 2013/0239722 | A1 | * | 9/2013 | Vollner ................... B66C 23/84 74/416 |
| 2013/0270060 | A1 | * | 10/2013 | Houssian ............... B65G 33/14 198/300 |
| 2014/0053825 | A1 | * | 2/2014 | Zhou ..................... F24S 30/425 126/606 |
| 2014/0352465 | A1 | * | 12/2014 | Chae ....................... F16H 19/04 74/30 |
| 2015/0300479 | A1 | * | 10/2015 | Frank ..................... F16H 57/021 324/207.2 |
| 2015/0316639 | A1 | | 11/2015 | Russ et al. |
| 2019/0024764 | A1 | * | 1/2019 | Plesniak ............... F16H 19/025 |

FOREIGN PATENT DOCUMENTS

| | | | | |
|---|---|---|---|---|
| CN | 102287521 A | | 12/2011 | |
| CN | 202493648 U | | 10/2012 | |
| KR | 101193402 B1 | * | 10/2012 | ......... F16H 57/021 |
| WO | WO-2014079467 A1 | * | 5/2014 | ......... F16H 57/021 |

OTHER PUBLICATIONS

Notice of Allowance dated Sep. 29, 2017 for U.S. Appl. No. 14/499,111.
Office Action dated May 8, 2017 for U.S. Appl. No. 14/499,111.
Office Action dated Jan. 10, 2017 for U.S. Appl. No. 14/499,111.
U.S. Appl. No. 15/809,893 Notice of Allowance dated Jul. 2, 2018.
U.S. Appl. No. 15/809,893 Office Action dated Feb. 28, 2018.

* cited by examiner

SLEW DRIVE GEARBOX WITH TORQUE TUBE

CROSS-REFERENCE TO RELATED APPLICATION

This application claims the benefit of U.S. Provisional Application No. 61/879,250, filed 18 Sep. 2013.

FIELD OF THE INVENTION

This invention relates to gearboxes.

More particularly, the present invention relates to Slew drive gearboxes.

BACKGROUND OF THE INVENTION

In the field of drive systems, a slew drive is a device that can safely hold radial and axial loads, as well as transmit a torque for rotation. A slew drive employs a worm mechanism, also called a screw drive, to turn a gear about an axis perpendicular to the axis of the worm. This combination reduces the speed of the driven member and also multiplies its torque. There are many applications for the slew drive. Currently, they are employed in the generation of renewable energy, particularly in solar and wind energy. Due to the load-holding power and rotational torque strength of slew drives, they are well suited to solar trackers and wind turbines. They can, however, be employed in substantially any instance where rotational movement, or "slewing" is desired.

While the current slew drives function quite well in performing the desired tasks, they can be difficult to attach to the structure to be rotated, can be heavy and can also be costly. Attaching a slew drive to structures to be rotated usually requires the fabrication of fittings to couple structures to the drive. Also, as the slew drive is increased in size to meet various uses, the weight can become increasingly problematic since as the worm and the driven gear are increased in size, the weight of material can rise quickly. In the industries in which slew drives are primarily used, less weight allows for quicker an easier installation of the drive, and less weight also allows for less manpower and additional cost savings.

Additionally, the cost of a slew drive often depends on the accuracy of rotation of the drive. A high accuracy is accomplished during fabrication of the driven gear. The tolerances achieved when machining or otherwise creating the teeth of the gear can greatly add to the cost of the slew drive, depending on the accuracy desired. This accuracy can be compromised during assembly of the slew drive gearbox. Bearings are tempered, and other heat treatments, are often required during assembly. These fluctuations in temperature can distort and reduce the accuracy of the driven gear. Thus, to maintain accuracy, the driven gear is often refinished to restore tolerances and eliminate distortions. Often, these tolerances cannot be completely restored to the original. This further adds to the cost of the drive. Accuracy is also reduced by the normal wear over time, on the driven gear as it is used.

It would be highly advantageous, therefore, to remedy the foregoing and other deficiencies inherent in the prior art.

An object of the present invention is to provide a new and improved slew drive.

Another object of the present invention is to provide a slew drive that has reduced weight.

Yet another object of the present invention is to provide a slew drive with increased accuracy.

And another object of the present invention is to provide a slew drive with a replaceable driven gear segment.

And yet another object of the present invention is to make the installation of a slew drive easier.

SUMMARY OF THE INVENTION

Briefly, to achieve the desired objects and advantages of the instant invention provided is a slew drive. The slew drive includes a housing, a worm shaft having a worm thread carried within the housing for rotational movement, and a torque tube having an outer diameter and a central socket. The torque tube is carried by the housing for rotational movement perpendicularly to the worm shaft and worm thread. A ring gear section with teeth is carried by the torque tube so that the teeth extend beyond the outer diameter of the torque tube and engage the worm threads. Rotation of the worm shaft rotates the worm threads engaging the teeth of the ring gear section, thereby rotating the ring gear section which rotates the torque tube.

In a further aspect, the housing includes an annular portion and a tubular portion. The annular portion defines an annular volume encircling a central aperture. The torque tube is carried within the annular portion. The tubular portion is coupled to the annular portion and defines a volume having a longitudinal axis forming a tangent to an outer diameter of the annular portion. The annular volume defined by the annular portion and the volume defined by the tubular portion are in communication, with the volume defined by the tubular portion overlapping the annular volume defined by the annular portion as a chord with respect to the outer diameter of the annular portion. The worm shaft having the worm thread is carried within the volume defined by the tubular portion. At least a portion of the worm threads extend into the annular volume at the chord and engage the teeth of the ring gear section.

BRIEF DESCRIPTION OF THE DRAWINGS

The foregoing and further and more specific objects and advantages of the invention will become readily apparent to those skilled in the art from the following detailed description of a preferred embodiment thereof, taken in conjunction with the drawings in which.

DETAILED DESCRIPTION OF A PREFERRED EMBODIMENT

Figure 1:
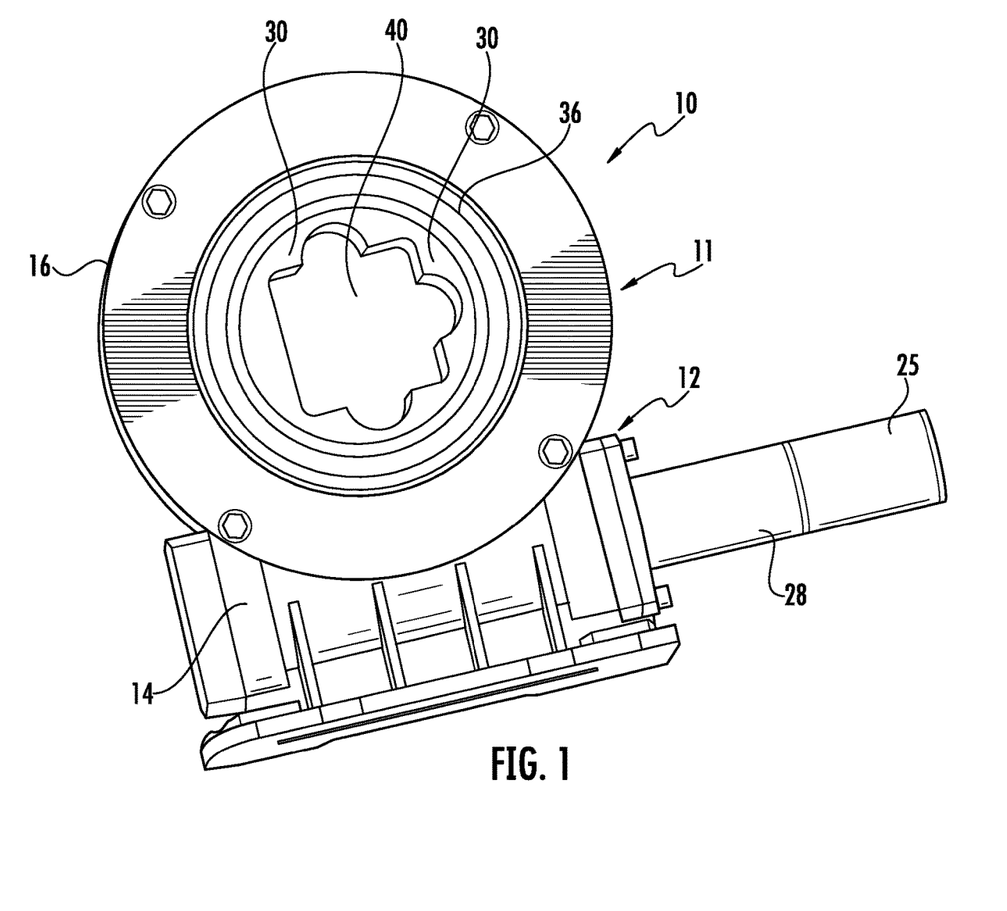
FIG. 1 is a perspective side view of a slew drive according to the present invention.
Figure 2:
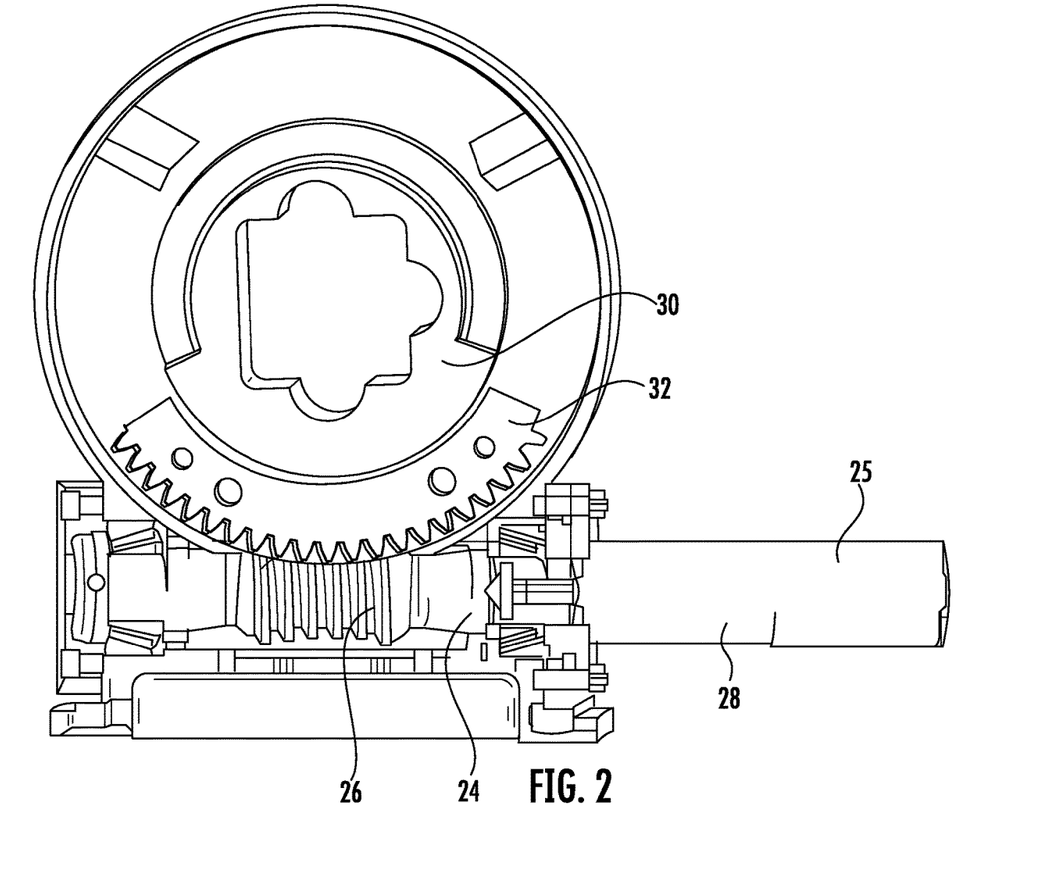
FIG. 2 is a sectional side of the slew drive of FIG. 1.
Figure 3:
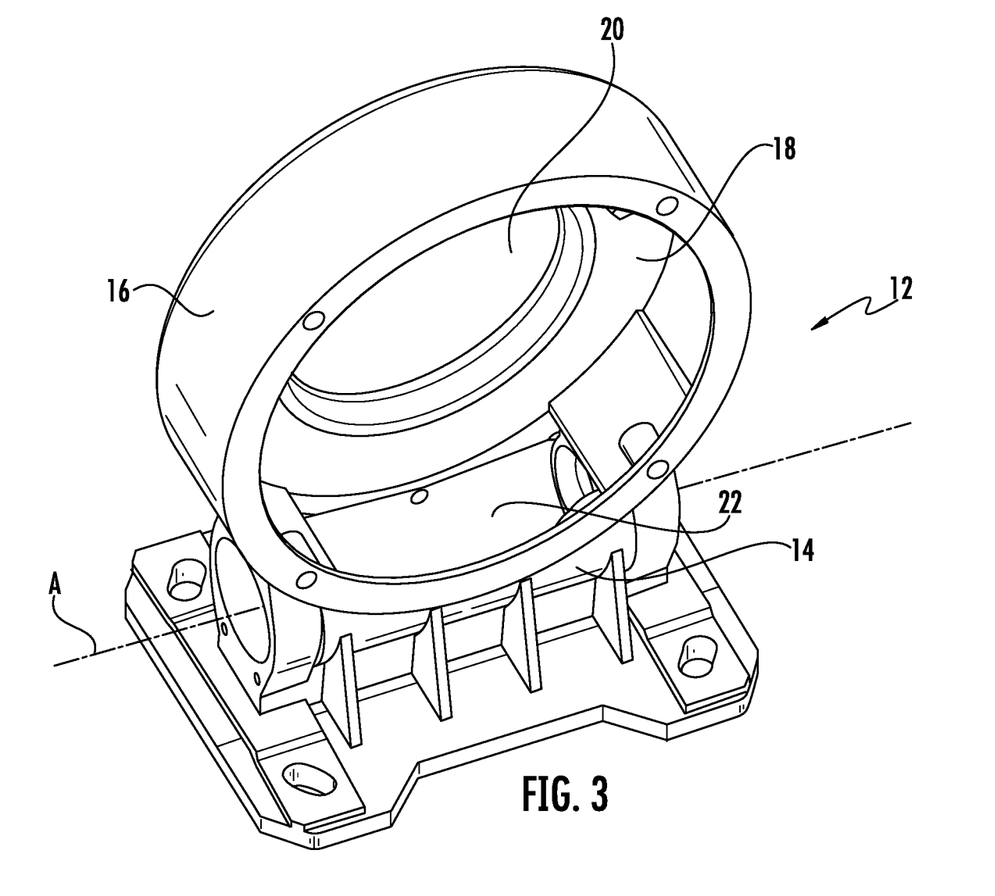
FIG. 3 is a perspective side view of the housing for the slew drive gearbox of FIG. 1.

Turning now to the drawings in which like reference characters indicate corresponding elements throughout the several views, attention is directed to FIGS. 1 and 2 which illustrate a slew drive generally designated 10, according to the present invention. Slew drive 10 includes a gearbox 11 with a housing 12 having a tubular portion 14 and an annular portion 16. With additional reference to FIG. 3, annular portion 16 defines an annular volume 18 encircling a central aperture 20. Tubular portion 14 is coupled to annular portion 16 and defines a volume 22 having a longitudinal axis designated A. Longitudinal axis A forms a tangent to an outer diameter of annular portion 16. Annular volume 18 and volume 22 are in communication with volume 22 overlapping annular volume 18 as a chord with respect to the outer diameter of annular portion 16.

Still referring to FIGS. 1 and 2, slew drive 10 further includes a drive motor 25 coupled to tubular portion 14 of housing 12. Drive motor 25 is coupled to a worm shaft 24 carrying an hourglass shaped worm thread 26, by a planetary gear assembly 28. Planetary gear assembly 28 is not described or shown in detail, as these assemblies are well known in the art. Worm thread 26 is carried within volume 22 of tubular portion 14 of housing 12, and extends through annular portion 16 at the chord defined previously. Drive motor 25 drives worm thread 26 having a portion of worm thread 26 extending into annular volume 18. Annular portion 16 of housing 12 carries a torque tube 30 and a ring gear section 32. It will be understood that while an hourglass shaped worm thread 26 is preferred, a conventionally shaped worm thread can be employed. Also, while a drive motor 25 is carried by the housing in the preferred embodiment, it will be understood that when multiple slewing drives are employed, the slewing drives can be driven with a series of slave shafts from a master drive motor without using a motor on each individual slewing drive.

Figure 4:
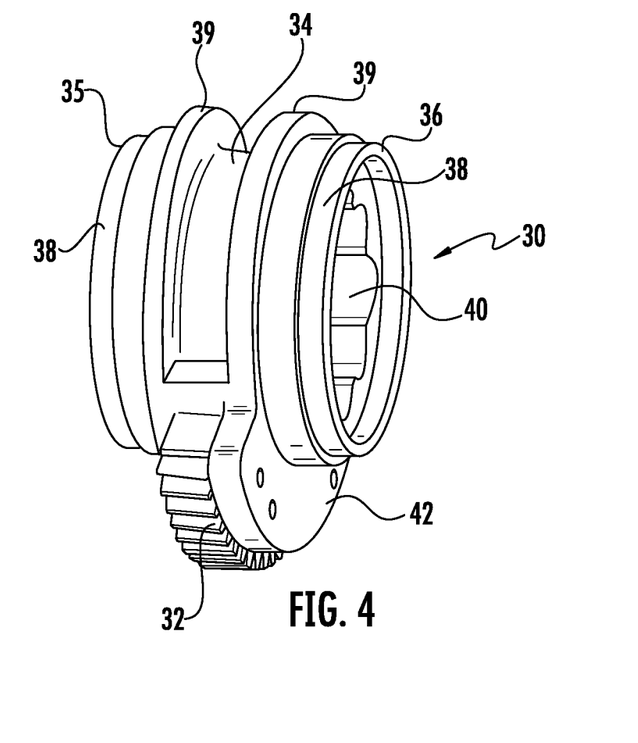
FIG. 4 is a perspective side view of the torque tube of the slew drive gearbox of FIG. 1.
Figure 5:
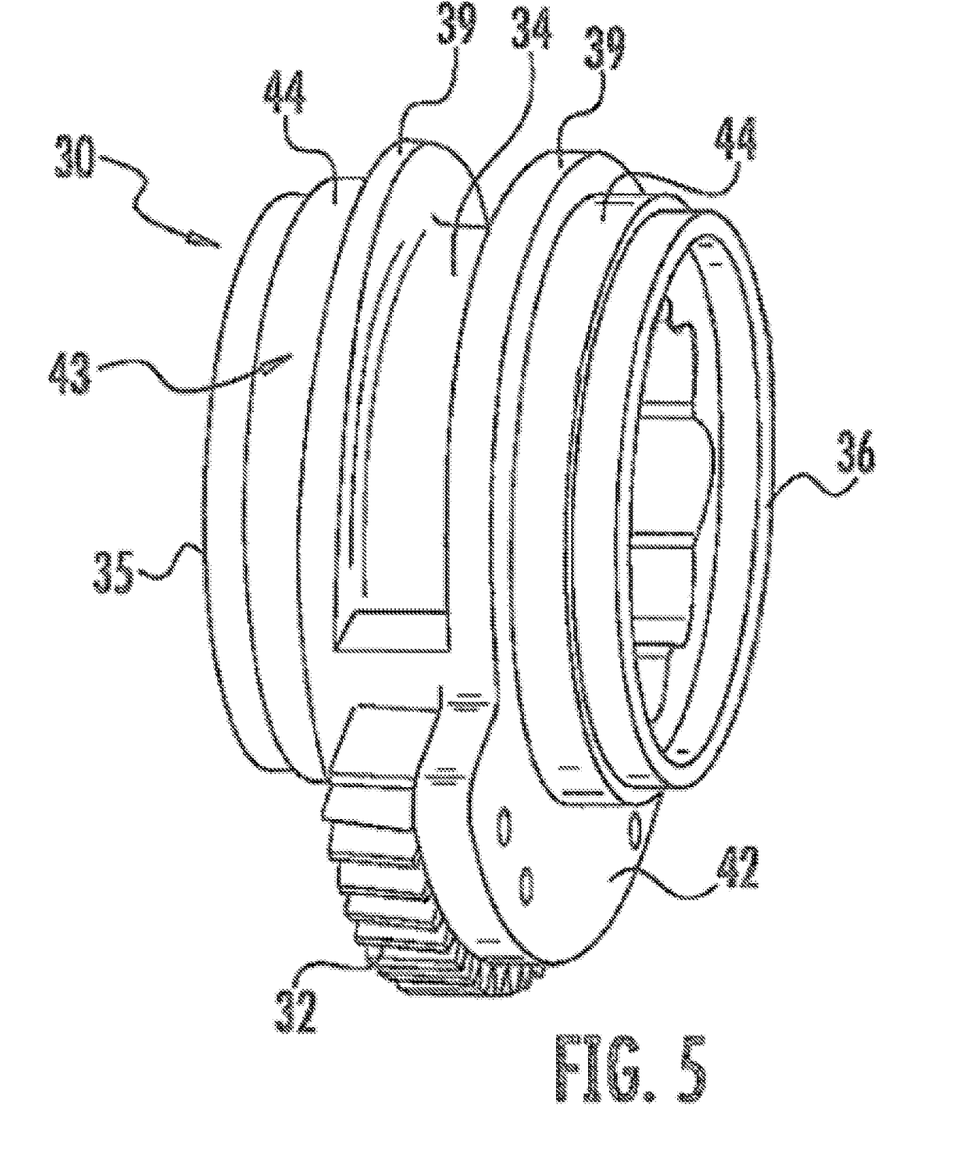
FIG. 5 is a perspective side view of the torque tube of the slew drive gearbox of FIG. 1 with bearing members.
Figure 6:
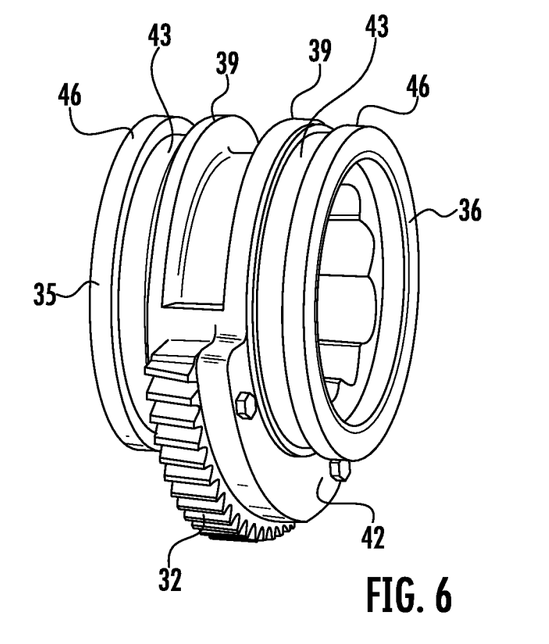
FIG. 6 is a perspective side view of the torque tube of the slew drive gearbox of FIG. 1 with sealing members.

With brief reference to FIGS. 4-6, FIG. 4 illustrates torque tube 30. Torque tube 30 includes an annular body 34 having opposed ends 35 and 36. Each end 35 and 36 includes an annular inset surface 38 formed at each end 35 and 36, and an annular extension 39 extending radially outwardly from body 34 and spaced apart from each end 35 and 36. Torque tube 30 defines central socket 40. A tab 42 extends from a portion of annular extension 39 at end 36. Ring gear section 32 is fixedly attached directly to tab 42 so as to be positioned generally centrally between ends 35 and 36. Ring gear section 32 can be directly machined into tab 42 or attached by fastening members such as pins, screws, bolts and the like, or permanent fasteners such as welding, adhesives and the like. It will be understood that ring gear section 32 is attached so that teeth of ring gear section 32 extend radially outwardly past tab 42. Here it should be noted that a ring gear has a full 360° circumference. Ring gear segment 32 of the present invention is a section of a ring gear less than 360°. In the preferred embodiment, a ring gear is divided into 2-4 segments for use. Thus the preferred segments are 90°, 120° and 180°, but can be anything less than 360°.

Turning specifically to FIG. 5, a bearing element 43 is position over each end 35 and 36, abutting annular extension 39, forming bearing surfaces 44. Bearing element 43 can be substantially any sort of bearing assembly such as ball bearing, low friction surfaces and the like. The type of bearing is only important as to allow rotation of torque tube 30 freely within annular portion 16. FIG. 6 illustrates torque tube 30 having a seal member 46 carried at each end 35 and 36 seated in annular inset surface 38.

Figure 7:
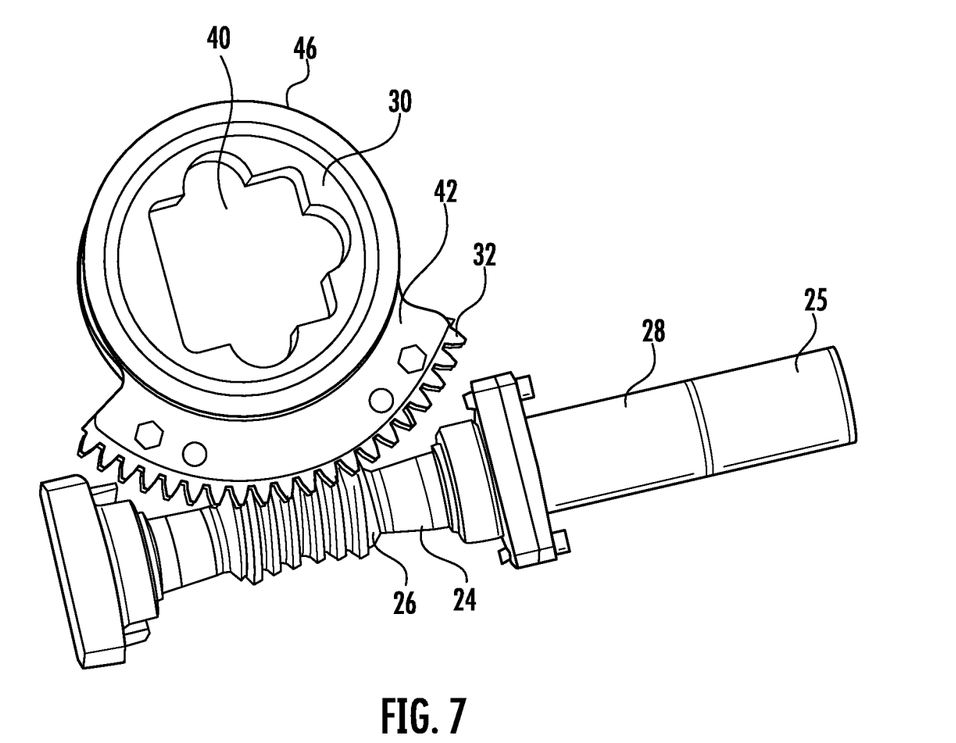
FIG. 7 is a partial perspective view of the slew drive with the housing removed.

Turning now to FIG. 7, torque tube 30 is carried by housing 12 so as to center ring gear section 32 within the overlap of volumes 18 and 22 (chord) and in engagement with worm thread 26. In this manner, as drive motor 25 drives worm shaft 24 in a first direction, ring gear section 32 is driven in a first direction with a corresponding rotation of torque tube 30 in the first direction. When drive motor 25 is reversed and drives the worm shaft in a second direction, ring gear section 32 is driven in a second direction with a corresponding rotation of torque tube 30 in the second direction. In this manner, when in use, housing 12 is installed as an immovable fixture. The centrally located torque tube can then be rotated relative housing 12.

Figure 8:
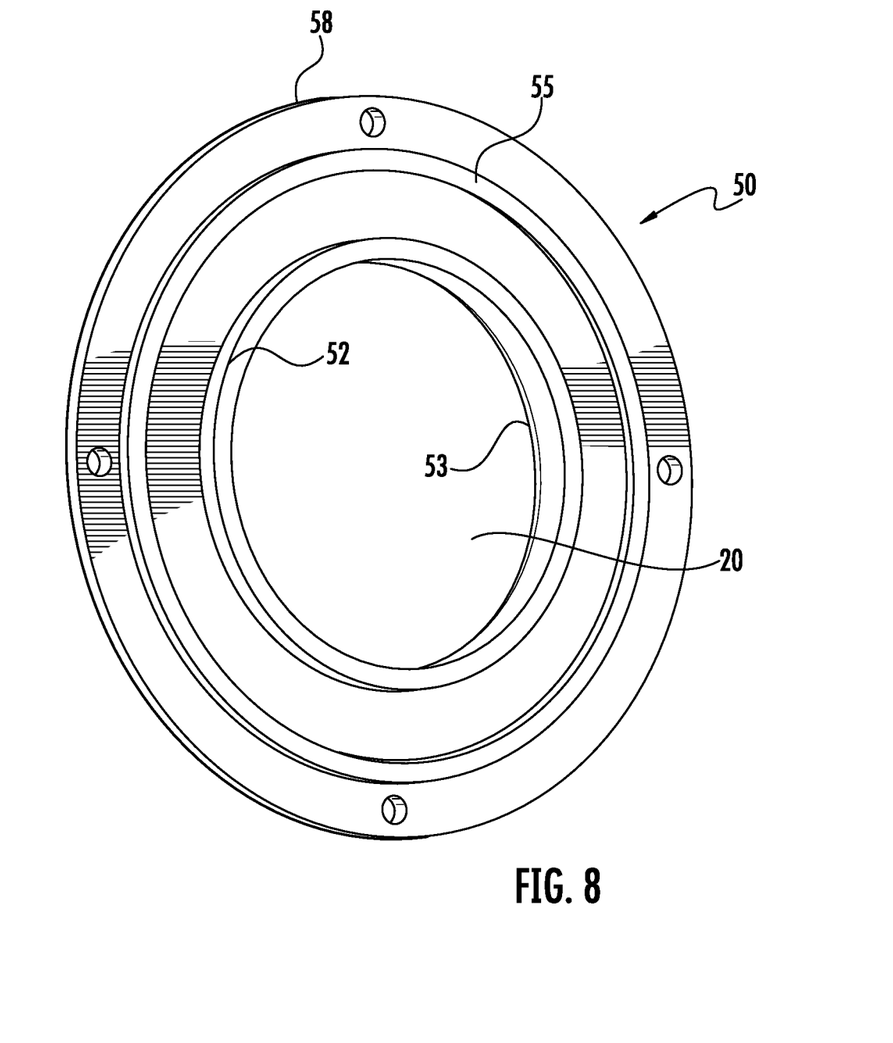
FIG. 8 is a perspective view of the back side of the housing cover.

Turning to FIG. 8, housing 12 is sealed by housing cover 50. An inner surface of cover 50 includes an annular extension 52 extending perpendicularly inwardly from an inner edge 53 defining aperture 20, and an annular extension 55 extending perpendicularly inwardly from the inner surface of cover 50 intermediate inner edge 53 and an outer edge 58. When positioned on housing 12, annular extension 52 engages seal member 46, and bearing member 43, effectively sealing housing 12 and permitting rotation of torque tube 30 with respect to housing 12 and cover 50. Annular extension 55 engages and seals against housing 12.

Various changes and modifications to the embodiments herein chosen for purposes of illustration will readily occur to those skilled in the art. To the extent that such modifications and variations do not depart from the spirit of the invention, they are intended to be included within the scope thereof, which is assessed only by a fair interpretation of the following claims.

Having fully described the invention in such clear and concise terms as to enable those skilled in the art to understand and practice the same, the invention claimed is:

1. A slew drive comprising:
 a housing;
 a worm shaft having a worm thread carried within the housing for rotational movement, wherein the worm thread comprises a plurality of threads distributed along a longitudinal portion of the worm shaft in an hourglass shape;
 a torque tube having an outer diameter and a central socket, the torque tube carried by the housing for rotational movement perpendicular to the worm shaft and the worm thread, wherein the torque tube comprises: (i) an annular body, (ii) a pair of annular extensions spaced apart from each other and extending radially outwardly from the annular body, and (iii) a tab radially extending from one annular extension of the pair of annular extensions; and
 a ring gear section having teeth that extend around less than a full circumference of the torque tube, wherein the ring gear section is provided on only one substantially planar face of the tab with the teeth extending beyond the radius of the tab and engaging the worm thread, wherein the ring gear section is located between the pair of annular extensions;
 whereby rotation of the worm shaft rotates the worm thread engaging the teeth of the ring gear section with the plurality of threads that is distributed along the longitudinal portion of the worm shaft in the hourglass shape, thereby rotating the ring gear section which rotates the torque tube relative the housing.

2. A slew drive as claimed in claim 1, wherein the housing further comprises:
 an annular portion defining an annular volume encircling a central aperture, the torque tube carried within the annular portion; and
 a tubular portion coupled to the annular portion and defining a volume having a longitudinal axis forming a tangent to an outer diameter of the annular portion, the annular volume defined by the annular portion and the volume defined by the tubular portion are in communication, with the volume defined by the tubular portion overlapping the annular volume defined by the annular portion as a chord with respect to the outer diameter of the annular portion, the worm shaft having the worm thread carried within the volume defined by the tubular portion, with at least a portion of the worm thread extending into the annular volume at the chord and engaging the teeth of the ring gear section.

3. A slew drive as claimed in claim 1, wherein the torque tube further comprises:
   an annular inset surface formed at each opposed end of a pair of opposed ends of the annular body;
   a bearing element positioned over each opposed end, abutting each annular extension of the pair of annular extensions and forming bearing surfaces; and
   a seal member carried at each opposed end and seated in the annular inset surfaces.

4. A slew drive as claimed in claim 1, further including a drive motor coupled to the worm shaft.

5. A slew drive as claimed in claim 4, wherein the drive motor is coupled to the worm shaft by a planetary gear assembly.

6. A slew drive as claimed in claim 1, wherein the ring gear section is formed as a single piece with the tab.

7. A slew drive as claimed in claim 1, wherein the ring gear section is removably coupled to the tab.

8. A slew drive as claimed in claim 1, wherein the ring gear section is permanently coupled to the tab.

9. A slew drive as claimed in claim 1, wherein the ring gear section is located radially offset from and between the pair of annular extensions.

10. A slew drive as claimed in claim 1, wherein the tab comprises another substantially planar face that is axially opposite to the substantially planar face on which the ring gear section is provided.

11. A slew drive as claimed in claim 1, wherein the ring gear section comprises a substantially planar portion that is coupled to the substantially planar face of the tab.

12. A slew drive as claimed in claim 11, wherein the ring gear section comprises another substantially planar portion that is exposed.

13. A slew drive comprising:
   a gearbox including:
   a housing having a tubular portion and an annular portion, the annular portion defining an annular volume encircling a central aperture, the tubular portion coupled to the annular portion and defining a volume having a longitudinal axis forming a tangent to an outer diameter of the annular portion, the annular volume defined by the annular portion and the volume defined by the tubular portion are in communication, with the volume defined by the tubular portion overlapping the annular volume defined by the annular portion as a chord with respect to the outer diameter of the annular portion;
   a worm shaft having a worm thread carried within the volume defined by the tubular portion, wherein at least a portion of the worm thread extends into the annular volume at the chord, wherein the worm thread comprises a plurality of threads distributed along a longitudinal portion of the worm shaft in an hourglass shape;
   a torque tube having an outer diameter and a central socket, the torque tube carried by the housing for rotational movement within the annular portion of the housing, wherein the torque tube comprises: (i) an annular body, (ii) a pair of annular extensions spaced apart from each other and extending radially outwardly from the annular body, and (iii) a tab radially extending from one annular extension of the pair of annular extensions; and
   a ring gear section having teeth that extend around less than a full circumference of the torque tube, wherein the ring gear section is provided on only one substantially planar face of the tab with the teeth extending beyond the radius of the tab and engaging the portion of the worm thread extending into the annular volume at the chord, wherein the ring gear section is located between the pair of annular extensions; and
   a drive motor coupled to the worm shaft.

14. A slew drive as claimed in claim 13, wherein the torque tube further comprises:
   an annular inset surface formed at each opposed end of a pair of opposed ends of the annular body;
   a bearing element positioned over each opposed end, abutting each annular extension of the pair of annular extensions; and
   a seal member carried at each opposed end and seated in the annular inset surfaces.

15. A slew drive as claimed in claim 13, wherein the ring gear section is formed as a single piece with the tab.

16. A slew drive as claimed in claim 13, wherein the ring gear section is removably coupled to the tab.

17. A slew drive as claimed in claim 13, wherein the ring gear section is permanently coupled to the tab.

18. A slew drive as claimed in claim 13, wherein the drive motor is coupled to the worm shaft by a planetary gear assembly.

* * * * *